(12) United States Patent
Montalvo et al.

(10) Patent No.: US 9,141,884 B2
(45) Date of Patent: Sep. 22, 2015

(54) METHOD OF AUTOMATIC MANAGEMENT OF IMAGES IN A COLLECTION OF IMAGES AND CORRESPONDING DEVICE

(71) Applicant: THOMSON LICENSING, Issy de Moulineaux (FR)

(72) Inventors: Luis Montalvo, Cesson Sevigne (FR); Serge Defrance, Cesson Sevigne (FR); Remy Gendrot, Cesson Sevigne (FR); Frederic Lefebvre, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 209 days.

(21) Appl. No.: 13/717,764

(22) Filed: Dec. 18, 2012

(65) Prior Publication Data
US 2013/0163888 A1 Jun. 27, 2013

(30) Foreign Application Priority Data
Dec. 23, 2011 (EP) .................................. 11306771

(51) Int. Cl.
*G06K 9/62* (2006.01)
*G06F 17/30* (2006.01)

(52) U.S. Cl.
CPC ............ *G06K 9/627* (2013.01); *G06F 17/3028* (2013.01); *G06F 17/30038* (2013.01); *G06F 17/30268* (2013.01); *G06F 17/30271* (2013.01)

(58) Field of Classification Search
None
See application file for complete search history.

(56) References Cited

U.S. PATENT DOCUMENTS

| | | | |
|---|---|---|---|
| 6,480,840 B2 * | 11/2002 | Zhu et al. | 1/1 |
| 7,228,006 B2 | 6/2007 | Stubler et al. | |
| 8,285,052 B1 * | 10/2012 | Bhattacharyya et al. | 382/190 |
| 2006/0101060 A1 | 5/2006 | Li et al. | |
| 2007/0237426 A1 | 10/2007 | Xie et al. | |
| 2007/0260639 A1 | 11/2007 | Tobin et al. | |
| 2008/0317278 A1 | 12/2008 | Lefebvre et al. | |
| 2009/0208097 A1 | 8/2009 | Husseini et al. | |
| 2010/0166321 A1 * | 7/2010 | Sawant et al. | 382/209 |

FOREIGN PATENT DOCUMENTS

| | | |
|---|---|---|
| EP | 2579258 | 4/2013 |
| KR | 1030130 | 4/2011 |

OTHER PUBLICATIONS

M. Emre Celebi et al., "Human Perception-Driven, Similarity-Based Access to Image Databases", Copyright © 2005, American Association for Artificial Intelligence, 6 pages.*
Guo-Dong Guo et al., "Learning Similarity Measure for Natural Image Retrieval With Relevance Feedback", IEEE Transactions on Neural Networks, vol. 13, No. 4, Jul. 2002, pp. 811-820.*

(Continued)

*Primary Examiner* — Brian P Werner
(74) *Attorney, Agent, or Firm* — Myers Wolin LLC

(57) ABSTRACT

The present invention relates to the field of management of image data in data storage. In particular, the present invention relates to a method and device for automatic detection of duplicate images in data storage and corresponding device while taking into account user perception of what he considers to be duplicate images, which method and device are particularly efficient with regard to the personalized, automatic management of large amounts of image data.

10 Claims, 18 Drawing Sheets

(56) References Cited

OTHER PUBLICATIONS

Zhou Wang et al. Multi-Scale Structural Similarity for Image Quality Assessment, Proceedings of the 37th IEEE Asilomar Conference on Signals, Systems and Computers, Pacific Grove, CA, Nov. 9-12, 2003. © IEEE, 5 pages.*
European Search Report Apr. 4, 2012.
Hu et al., "Efficient near duplicate image detection by learning from examples", 2008 IEEE International Conference on Multimedia and Expo (ICME), Jun. 23-26, 2008, pp. 657-660.
Noda et al., "Detecting partially duplicated image regions in a digital image", Journal of the Institute of Image Information and Television Engineers, vol. 63, No. 11, Nov. 2009, pp. 1645-1651. English Abstract.
Paradowski et al., "Keypoint Based Detection of Near Duplicate Image Fragments Using Image Geometry and Topology", Computer Vision and Graphics, Proceedings International Conference, ICCVG 2010, Sep. 20-22, 2010, pp. 175-182.
Chupeau et al., "Automatic estimation and compensation of geometric distortion in video copies", SPIE 2007, pp. 1-9.
Evans: "Notes on the open surf library", University of Bristol, Technical report CSTR-01-001, Jan. 2009, pp. 1.
Golub et al, "Matrix computations", Third edition, The Johns Hopkins University Press, Baltimore, 1996, pp. 1-723.
"Libpuzzle, A library to find similar pictures", http://www.pureftpd.org/project/libpuzzle, Mar. 24, 2009, pp. 1-3.
Salfner et al., "A survey of online failure prediction methods", ACM Computing Surveys, vol. 42, Issue 3, Mar. 2010, pp. 1-68.
Smeulders et al., "Content Based Image Retrieval at the End of the Early Years", IEEE transactions on pattern analysis and machine intelligence, vol. 22, No. 12, Dec. 2000, pp. 1349-1380.
Wong et al., "An image signature for any kind of image", Proceedings of the 2002 international conference on image processing, vol. 1, 2002, pp. 1-409 -1-412.
Montalvo et al., "Systeme de stockage en ligne de photos avec confidentialite des donnees personnelles", presentation at SSTIC 2011, Rennes, France, Jun. 10, 2011, pp. 1-36.
Montalvo et al., "Systeme de stockage en ligne de photos avec confidentialite des donnees personnelles", SSTIC 2011, Rennes, France, Jun. 10, 2011, pp. 1-17.

* cited by examiner

METHOD OF AUTOMATIC MANAGEMENT OF IMAGES IN A COLLECTION OF IMAGES AND CORRESPONDING DEVICE

This application claims the benefit, under 35 U.S.C. §119 of EP Patent Application 11306771.4, filed 23 Dec. 2011.

1. FIELD OF INVENTION

The present invention relates to the field of management of image data in data storage. In particular, the present invention relates to a method and device for automatic detection of duplicate images in data storage and corresponding device while taking into account user perception of what he considers to be duplicate images, which method and device are particularly efficient with regard to the personalized, automatic management of large amounts of image data.

2. TECHNICAL BACKGROUND

The proliferation of digital devices that comprise a photo camera has favored an explosion of the volume of image data stored by a user, and it is quite easy for a user to end up with many image duplicates in the user's image library.

This situation can be even worse in the case of a home network environment, where several users can add images to an image library, the library possibly being physically distributed on several, dispersed storage devices, for example on hard drives of different PCs, on a NAS (Network Attached Storage), on USB keys, etc.).

The reasons why an image library can end up by containing many duplicate images are diverse. Unintentional duplicate images are produced through copy actions. For example, a user who organizes photos in different directories does not move the photos, which would have been appropriate, but rather copies them unintentionally; a user that wishes to transfer photos via e-mail adapts the photo resolution for including them in his e-mail but unintentionally keeps the low-resolution copies; a user that views images with a viewer application modifies these by rotation, or modification of color and contrast and unintentionally keeps the unmodified copy in addition to the modified copy. Other copy actions are intentional and are due to the fact that the user has no longer an overview of the data that he has stored, a situation that is getting worse when the user has multiple storage devices and many images, and gets even worse when multiple users add and copy data to the multitude of images stored. The user, knowing that he does not have a clear overview of the images stored, worsens this situation by preferring finally to copy rather than to move or replace images, by fear of deleting them. This creates a situation where the user no longer knows which images are disposable copies and which are not.

In all these scenarios, a duplicate detection tool can be useful, to assist the user with the cleanup or management tasks of the user's image library.

Prior-art detection of image duplicates allows to detect duplicates according to criteria such as checksum data, creation data, file name, file size, and image format. Duplicates are detected that comply with any of the selected criteria and upon each detection user intervention is needed to determine if the user wishes to delete or not the detected duplicates from the image library. The reason why the final decision about what actions to carry out on the duplicate images is left to the end user is that the perception of what constitutes a duplicate image is a subjective matter. Depending on the user and the context, a duplicate image can be: an exact (bit-by-bit) copy of an image, a copy of an image visually identical but that has been encoded with a different compression algorithm, a copy of an image visually identical but that has undergone geometrical or colorimetric transformations, etc.

What is thus needed is a method capable of translating this subjective perception into parameters required for de-duplication so that the operation can be autonomous and adapted to the user's duplicate-image perception.

The European patent application no. EP11306284.8 filed Oct. 4, 2011, "Method of automatic management of a collection of images and corresponding device", proposes a method to detect image duplicates that uses a set of tags to identify the different copies of an image with a label representative of the kind of duplicate, i.e., duplicate or near-duplicate. In the near duplicate case, the tag also indicates how the copy of the image differs from the original one. In some particular cases, the information supplied by these tags is used by the end user to make a decision about what duplicate images to remove from the photo library. The reason why the final decision about what actions to carry out on the duplicate images is left to the end user is that the perception of what constitutes a duplicate image is a subjective matter. The system described in the mentioned European patent application is conceived to identify the broadest range of transformations that an image can undergo in the framework of a residential photo library. The checksum technique is used to detect the bit-by-bit exact duplicate images and the fingerprint technique is used to detect the near-duplicate images. The fingerprint technique is tuned in order to detect the most severe transformations that can be applied to an image in a personal photo library because the technique has to be conceived for the worst case conditions. It is worth mentioning that the computation time of the fingerprint of an image increases with the complexity of the transformation to be detected and it is much higher (up to 500 times) than the computation time of the checksum of an image. This is not optimum in the cases where the user considers as duplicates only the bit-by-bit exact copies of an image, or the visually identical images but with different resolutions, because in these cases the checksum computation tool or a simpler but faster fingerprint computation tool could be used to identify the desired duplicate and near-duplicate images. Therefore, it is desirable to take into account for the automatic management also the duplicate-image perception that the user has.

In this invention disclosure, we propose a method to capture the subjective duplicate-image perception from the end user and to translate this subjective perception into the objective parameters required for an automatic management of images in an image collection.

3. SUMMARY OF THE INVENTION

The discussed advantages and other advantages not mentioned in this document will become clear upon the reading of the detailed description of the invention that follows.

In order to optimize the management of images in an image collection, the invention proposes a method of automatic classification of images in a collection of images, comprising classifying, according to user perception of resemblance, of transformed images in image sets, the transformed images being based on a same reference image, each of the transformed images having a distinct fingerprint distance with regard to the reference image; and determining of at least one fingerprint distance threshold that delimits the determined image sets within fingerprint distance zones; and automatic classification of the images in the image collection, for each image i in the image collection, determining of a fingerprint distance between the image i and each of other n−1 images in the image collection, and classifying the each of other n−1 images in one of the fingerprint distance zones according to the determined fingerprint distance.

According to a variant embodiment of the invention, the method further comprises associating an action to each of the determined fingerprint distance zones, and executing of an action associated to fingerprint distance zone for each image that is classified in one of the fingerprint distance zones.

According to a variant embodiment of the invention that can advantageously be combined with the previous embodiments, the at least one fingerprint distance threshold comprises at least a first and at least a second fingerprint distance threshold, the first fingerprint distance threshold limiting a first fingerprint distance zone inside which is a set of transformed images which the user classified in an identical and slightly modified image set, the second fingerprint distance threshold delimiting a second zone outside the first zone and inside which are transformed images which the user classified in a largely modified image set and outside which are transformed images which the user classified in an image set of different images.

According to a variant embodiment of the invention that can advantageously be combined with the previous variant embodiment, the method further comprises a step of determinating a fingerprint distance determination method to use for determination in which of the fingerprint distance zones an image falls, as a function of a position of the first and second thresholds relative to a position of a third threshold of fingerprint distance that determines a fingerprint distance zone inside which a first fingerprint determination method is to be used, and outside which a second fingerprint determination method can be used.

According to a variant embodiment of the invention the first fingerprint determination method is according to a local approach, and the second fingerprint method is according to a global approach.

According to a variant embodiment of the invention, the fingerprint distance determination is determined according to Euclidian distance between fingerprints.

The invention also concerns an image management device, comprising means for classifying, according to user perception of resemblance, of transformed images in image sets, the transformed images being based on a same reference image, each of the transformed images having a distinct fingerprint distance with regard to the reference image; and means for determining of at least one fingerprint distance threshold that delimits the determined image sets within fingerprint distance zones; for each image i in the image collection, means for determining of a fingerprint distance between the image i and each of other n−1 images in the image collection, and means for classifying the each of other n−1 images in one of the fingerprint distance zones according to the determined fingerprint distance.

According to a variant embodiment of the device of the invention, the device further comprises means for associating an action to each of the determined fingerprint distance zones, and means for executing of an action associated to fingerprint distance zone for each image that is classified in one of the fingerprint distance zones.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

European patent application no. EP 11306284.8 to Montalvo et al. describes a method of automatic management of a collection of images through association of metadata 'tags' to images in a collection and automatic determination and application of one of a set of predetermined actions for processing the images in the collection according to the associated metadata tags. In particular, EP 11306284.8 recognizes the following type of copy images:

1. Identical copy: The "copy" has no differences at all with the "original".
2. Backup copy: The "copy" has no differences at all with the "original" but it is stored in a storage area (device) labeled as backup zone.
3. Different resolution copy: Only the resolution of the "copy" is different from the "original". The tag also indicates the resolution of the copy.
4. Different encoding and/or compression copy: The "copy" is perceptually the same as the original, and the resolution of the copy is the same as that of the original but the encoding format and/or compression standard are different.
5. Slightly modified copy: The "copy" is perceptually the same as the "original" but some image processing algorithms, such as brightness/contrast enhancement, red-eye effect correction, and color filtering have been applied to the "original".
6. Largely modified copy: The "copy" might perceptually appear the same as the "original" but some editing modifications, such as resolution, color, encoding, cropping, annotation, and rotations, have been applied to the "original".
7. Different copy: The image is different from the original.

EP 11306284.8 defines metadata tags according to Table 1 hereunder which resumes example types of metadata tags, their meaning and their means of determination.

TABLE 1

| Tag | Meaning | Means for determination |
|---|---|---|
| IDC | Image 'b' is an Identical Copy of image 'a' | Checksum |
| BC | Image 'b' is a Backup Copy of image 'a' | Checksum and storage location |
| LMC | Image 'b' is a Largely Modified Copy of image 'a' | Normalized image fingerprint distance (th1 < NFD < th2) |
| DRC | Image 'b' is a Different Resolution Copy of image 'a' | Image resolution, (NFD < th1) |
| DEC | Image 'b' is a Different Encoding Copy of image 'a' | Image encoding method, (NFD < th1) |
| SMC | Image 'b' is a Slightly Modified Copy of image 'a' | Normalized image fingerprint distance (NFD < th1) |

Figure 1:
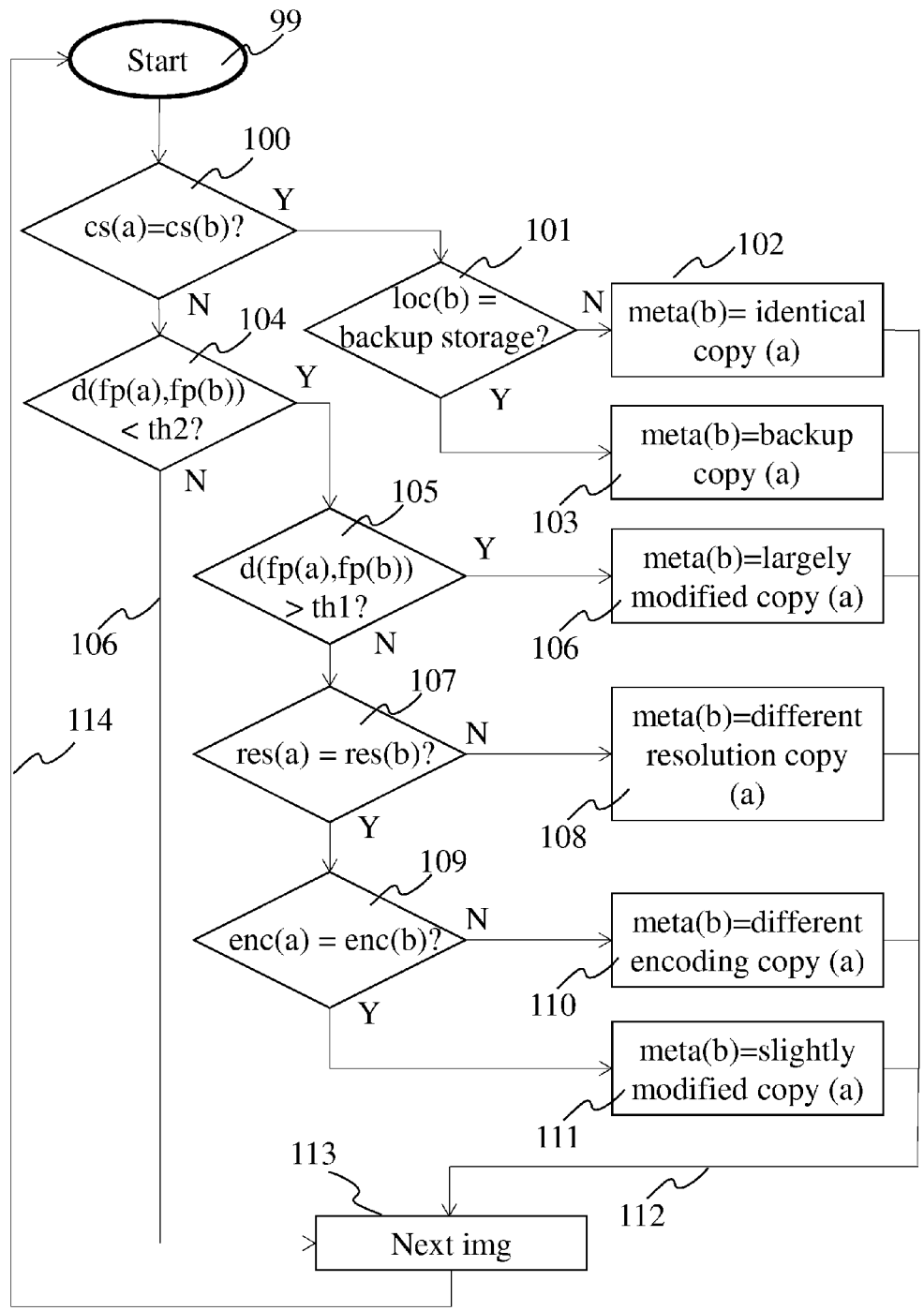
FIG. 1 shows a prior-art determination method of metadata tags.

EP 11306284.8's determination of such metadata tags is illustrated by FIG. 1. In test step 100, it is determined if a checksum calculated over a first ("a") image is the same as a checksum calculated over a second ("b") image. Checksum calculation is done through known methods, such as SHA (Secure Hash Algorithm) or MD5 (Message Digest 5). If the calculated checksum is the same, the two images are considered as being identical and a decisional step 101 is done, in which it is determined if the location where the second ("b") image is stored is a location for storage of backup. If so, metadata is added in step 103 to the identical second ("b") image that indicates that the second image is a backup copy of the first image. If not, metadata is added in step 102 to the identical second image that indicates that the second image is an identical copy. As will be handled further on, it is possible to automatically delete identical images that are not backup copies by execution of actions associated to metadata. If, as an outcome of test step 100 it is on the contrary determined that the checksums of the first and the second images are different, a test step 104 is executed, in which it is determined if a normalized distance d between fingerprints of the first "a" image fp(a) and of the second "b" image fp(b) is below a first threshold th2 d(fp(a),fp(b))<th2; th2 is a threshold that is chosen such that if d(fp(a),fp(b))<th2, the second image "b" can be considered as being a modified copy of the first image "a". If d(fp(a),fp(b)) is not inferior to th2, the first and the second images are considered as being different and the method continues with step 113. But if d(fp(a),fp(b)) is inferior to th2, we are dealing with a modified copy and it can be determined in following steps how the difference between the two images can be characterized. Notably, in a next step 105, the previously calculated normalized fingerprint distance is compared with a next threshold th1. If d(fp(a),fp(b)) is superior to th1, the second image "b" is characterized in a step 106 as being a largely modified copy of the first image "a" and corresponding metadata is associated to the second image for example according to table 1, first row (LMC, <path>/a). If on the contrary d(fp(a),fp(b)) is inferior to th1, a test step 107 is executed, in which it is verified if the first image ("a") has the same resolution as the second image "b". Image resolution can be compared based on file metadata that is present in file systems, such as EXIF (Exchangeable Image File Format). If the image resolutions differ, a step 108 is executed in which metadata is associated to the second image that indicates that the second image is a different resolution copy of the first image; e.g. a tag 'DRC' is added to metadata associated to image b together with the storage path of image a: (DRC, <path>/a). If on the contrary the resolution of the first image differs from that of the second image, a next test step 109 is executed, in which the encoding methods of the two images are compared. This comparison is done according to known methods as for example by comparing file extensions (e.g. *.jpg, *.tiff). If the two images are encoded with a different encoding method, a step 110 is executed in which corresponding metadata is associated to the second image, e.g. a tag 'DEC' is added to image b together with the storage path of image a: (DEC, <path>/a). If on the contrary the two images are encoded with the same encoding method, step 111 is executed in which metadata (SMC, <path/a>) is associated to the second image. After steps 102, 103, 106, 108, 110 and 111, the steps of the method are iterated (blocks 113/99) until all images have been processed.

EP 11306284.8 further describes the use of a lookup table for looking up actions that are associated to a tag type. Table 2 hereunder illustrates an example lookup table for looking up actions that are associated to a tag type. The tag types used are those defined in table 1. For a tag type 'IDC' (Identical Copy) the associated action executed by the method of the invention is to replace the second image ("b") by a link to the first image ("a"). When a second image has a metadata tag BC or LMC, no action is associated since it is wished to keep the second image. When the second image has a tag 'DRC', the associated action is to delete the second image only when the second image has a lower resolution than the first image. When the second image has an associated metadata tag 'DEC', the associated action is to delete the second image only if the first image is of the 'png' encoding type. When the second image has an associated tag 'SMC', the associated action is to ask the user to decide what to do. Multiple metadata tags can be associated to a single image. For example, a same image can have both DRC and DEC tags, meaning that the image is a different resolution copy but also a different encoding copy. Using the previous example of an image that has both DRC and DEC tags and referring to table 2, an associated action is to only delete the image if both action conditions apply, i.e. to delete the second image the resolution of the second must be lesser than that of the first image AND the first image is encoded according to the PNG (Portable Network Graphics) encoding method. EP 11306284.8 describes a variant in which the actions are user-configurable.

TABLE 2

| Tag | Action |
|---|---|
| IDC | Replace b by link to a |
| BC | None |
| LMC | None |
| DRC | Delete b if res(b) < res (a) |
| DEC | Delete b if enc(a) = *.png |
| SMC | Ask |

For automatic management of the "slightly modified", the "largely modified", and the "different" copy images (5, 6 and 7), EP 11306284.8 uses a normalized distance d between fingerprints of two images, for example between an image to add to the image collection (e.g. image 'b') and an image in the image collection (e.g. image 'a').

Figure 2:
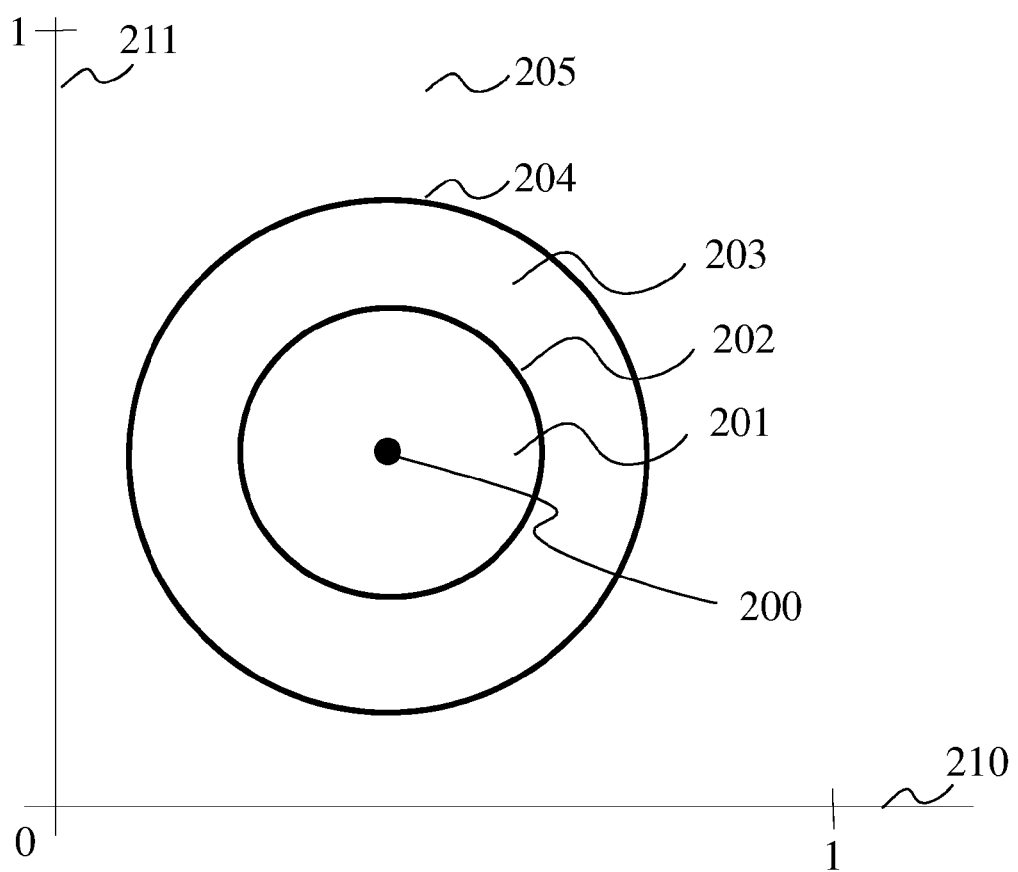
FIG. 2 illustrates the notion of normalized fingerprint distance (NFD) between two images and the relation between NFD and discussed thresholds.
Figure 15:
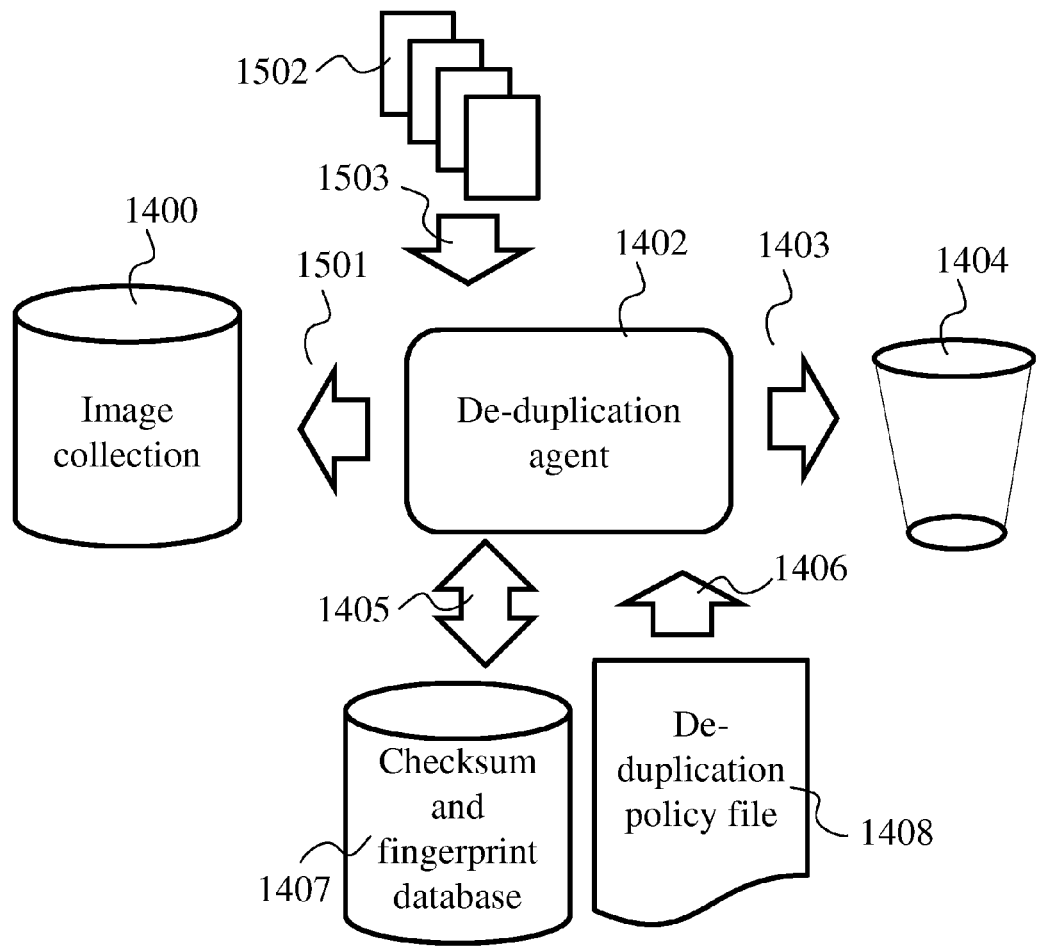
FIG. 15 illustrates an autonomous mode of a de-duplication agent implementing the invention.

FIG. 2 illustrates the notion of normalized fingerprint distance (NFD) between two images and the relation between NFD and discussed thresholds. To be able to classify an image by its differences with another image, NFD is one of the 'tools' used by the method of EP 11306284.8. Two fixed thresholds (th1 and th2) are used representing certain values of normalized distances between fingerprint vectors of the second ('b') image and the first ('a') image. This normalized distance can be expressed as:

$$\Delta(a, b) = \frac{\|a - b\|}{\|a + b\|}$$

Where ||.|| represents an L2 norm of a vector, i.e. its Euclidian distance. Note that other norms can be used as a measure of distance. FIG. 15 illustrates some alternatives. Image fingerprinting is a technique that allows to extract from an image discriminating features. Image fingerprints of two different images can then be compared to detect differences between those images based on a comparison of the discriminating features by calculating an image fingerprint distance between two image fingerprints, for example according to the above mentioned normalized distance. Image fingerprinting techniques can be categorized according to two main approaches: a global description approach and a local description approach. The global description approach considers an image as a whole and extracts global image characterizing features such as a color/luminance histogram or image texture. The local approach by contrast considers an image as a multitude of spatially localized characterizing features. The global approach is faster in terms of calculation speed than the local approach. However a fingerprint distance determination based on fingerprints calculated with the global approach is not very suitable for detection of image transformations caused by strong distortions such as cropping, occlusion and image editing and geometrical distortions such as rotation and scaling. An exception is the RASH (RAdon Soft Hash) global approach algorithm. RASH provides a good tradeoff between calculation speed and detectability of the previous mentioned distortions. It is not very well suited for detection of transformations caused by strong cropping and strong editing but is able to detect geometrical transformations, such as small rotations and scaling, and compression. The zone in which the RASH method for fingerprint distance determination can be applied is defined by an intrinsic constraint of fingerprint distance boundary, which is explained further on with the help of FIGS. 8-10. If a transformation is too strong (=too important) the use of the RASH method will not be adequate, and the local approach is rather to be used. The local approach is more resistant against strong distortions and provides interesting properties to identify a geometrical distortion. Local approaches are mainly techniques based on points of interest. As an example of transformations, restricted to spatial distortion for illustrative reasons (other distortions are possible, such as luminance, color, etc), by pairing points of interest chosen in a reference image and a candidate image and using a robust estimation method (least median square) an eight-parameter homographic model of the spatial distortion can be constructed from which any shifting, rotation, scaling transformations can be determined with a high level of accuracy. Such an eight-parameter homographic model of the spatial distortion model can be represented as:

$$\begin{cases} x' = \dfrac{h_{00}x + h_{01}y + h_{02}}{h_{20}x + h_{21}y + 1} \\ y' = \dfrac{h_{10}x + h_{11}y + h_{12}}{h_{20}x + h_{21}y + 1} \end{cases}$$

Where (x',y') represent the pixel coordinates of a given interest point in the transformed image (e.g. second 'b' image), and (x,y) represent the pixel coordinates of the corresponding interest point in the reference image with which the transformed image is compared (e.g. a first 'a' image). The parameters h11 and h00 provide the estimated scaling factor, i.e. the factor by which the transformed image is scaled from the compared image (See FIG. 14c). The parameters h01, h10, h20 and h21 provide the information to compute the estimated rotation of the transformed image with regard to the reference image (See FIG. 14a). Finally, the parameters h02 and h12 provide the estimated shifting of the transformed image with regard to the reference image (See FIG. 14b). The average error on the model of distortion between the transformed image and the image that is used as a reference image, can determine if the image has been slightly or highly modified. The average error is a function of the estimated $h_{ij}$ parameters for all the matching interest points between the candidate and the reference images (i, j□ {0, 1, 2}|(i=j)≠2). Note that this average error is actually the distance between the fingerprints of the two images where the fingerprints are represented by the set of $h_{ij}$ parameters.

EP 11306284.8 explains that an image fingerprint, constructed according to known prior-art methods, can be represented as an n-dimensional vector. "n" can have a value of hundred or even thousand. In EP 11306284.8's example he assumes that n=2 for simplicity of illustration. The center of FIG. 2 (200) represents the image fingerprint of image 'a', i.e. fp(a). Axes 210 and 211 represent respectively an X-axis of a fingerprint distance and a Y-axis of a fingerprint distance from the reference point fp(a). The zone 201 in the first circle around fp(a) corresponds to the fingerprints of the 'b' images whose distance to the fingerprint of the 'a' image is lower than the first threshold th1 (202), and represents 'b' images that have been slightly modified with regard to the 'a' image. Zone 203 in the second circle around fp(a) corresponds to fingerprints of 'b' images whose distance to the fingerprint of the 'a' image is higher than the first threshold th1 (202) but lower than the second threshold th2 (204), and represents 'b' images that have been largely modified with regard to the 'a' image. The zone 205 outside of the second circle corresponds to fingerprints of 'b' images whose distance d to the fingerprint of the 'a' image is higher than the second threshold th2 (204), and represents 'b' images that can be considered to be different with regard to the 'a' image.

EP 11306284.8 thus describes the use of fingerprint distance between two images and defines two fixed thresholds of the normalized distances between the fingerprints of two images. But the fact that the thresholds are fixed does not recognize that the boundaries defined by the threshold are subjective and may be set differently according to the user. Then, if one allows for the thresholds to be set by the user, one needs to define a way to determine the value of these thresholds according to the user's perception. Those are the subjects of the present application.

Figure 3:
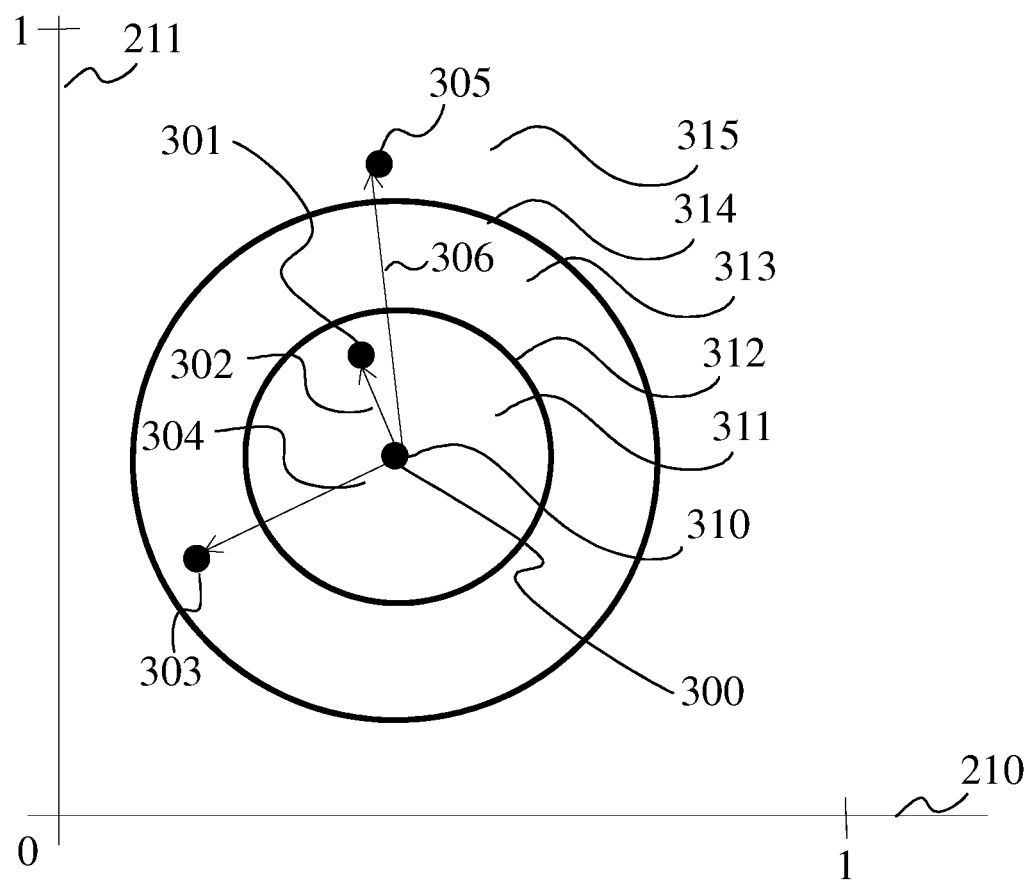
FIG. 3 illustrates the reference system used by the following illustrations.

FIG. 3 illustrates the reference system used by the following illustrations.

Point 300 represents the fingerprint of a reference image R. Points 301, 303 and 305 represent fingerprints of images A, B and C respectively, measured relatively to that of the reference image R. Their respective fingerprint distance from the reference image R is illustrated by arrows 302, 304 and 306 respectively. 310-315 represent the different 'zones'. 310 represent the possible values of fingerprint distance to a reference image 300 for all images that are perceived by the user as being identical (no noticeable difference). Zone 311 represents the possible values of fingerprint distance to a reference image 300 for all images that are perceived by the user as being slightly modified. Zone 312 represents the possible values of fingerprint distance to a reference image 300 that are perceived by the user as being largely modified. Outside this zone (315) are all possible values of fingerprint distance to a reference image 300 that are perceived by the user as being different. 312 represents a first threshold (th1). 314 represents a second threshold (th2).

Figure 4:
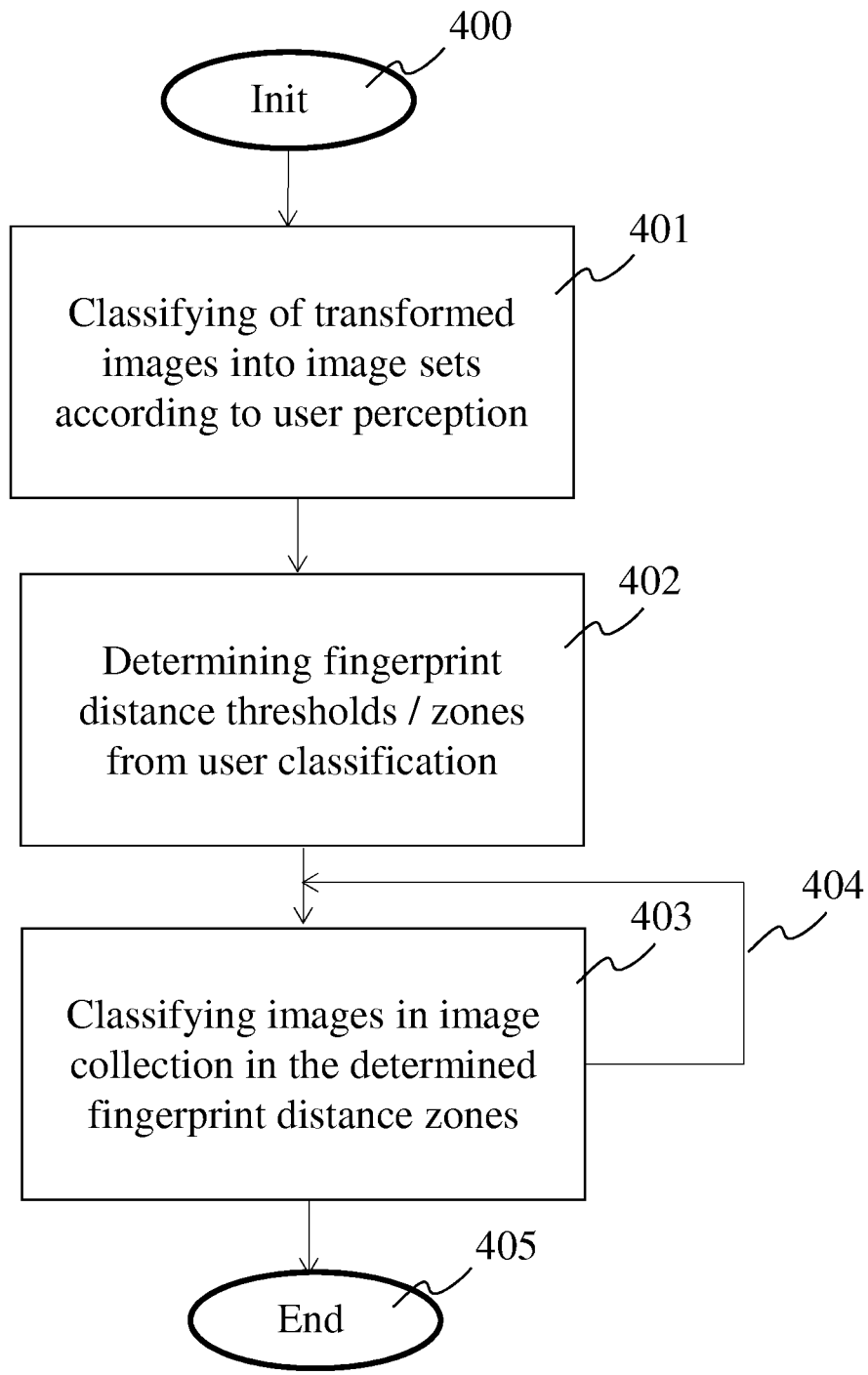
FIG. 4 illustrates a flow chart of the method of the invention.

FIG. 4 illustrates a flow chart of the method of the invention. In a first step 400, variables are initialized for the functioning of the method. When the method is implemented in a device such as device 1300 of FIG. 13, the step comprises for example copying of data from non-volatile memory to volatile memory and initialization of memory. In a next step 401 of classifying, the user classifies transformed images that are presented to him, in image sets according to his perception of which of the images resemble. The transformations are based on a same reference image (R). As an example, the transformations applied to the reference image are: resolution changes, cropping and encoding changes, rotations, and colorimetric modifications. The image sets comprise for example, a set of identical images (the user has not perceived any difference), a set of slightly modified images (the user has perceived differences but considers these differences as being minor), a largely modified image set (the user has perceived differences and considers these as being major), and a different image set (the user perceives that these images as being completely different). Each of the transformed images has a different associated fingerprint distance related to the reference image. Then, in a next step (402) the method determines from the classification at which distance from the reference image to set fingerprint distance thresholds, each threshold delimiting a fingerprint distance zone. As an example (see FIG. 3), a first fingerprint distance threshold (th1, 312) limits a first zone (310-311) of fingerprint distance inside which are found all transformed images which the user has classified in the identical and slightly modified image sets, and a second fingerprint distance threshold (th2, 314) delimits a second zone (313) outside the first zone and inside which are found all transformed images which the user has classified in the largely modified image set and outside which (315) are transformed images which the user has classified in the different image set. Steps 401 and 402 can be considered being 'learning' or 'calibration' steps.

Referring to the previously discussed eight parameter homographic model of spatial distortion, for each of the transformed images, the parameters $h_{ij}$ are known. The fingerprint distance thresholds placed by the user's classification correspond thus each to a value of the $h_{ij}$ parameters; for example, when a user classifies images rotated up to 15° as being slightly modified, but above 15° he classifies the image as being largely modified, and above 45° as being different, the thresholds th1 and th2 can be set and correspond to a set (h10, h01, h20, h21) of parameters corresponding to a transformed image with 15° degrees of rotation for th1, and to that of a transformed image with 90° degrees of rotation for th2. The $h_{ij}$ parameter values corresponding to the thresholds represent fingerprint distances. This determination of the thresholds according to the user's classification is done in step 402. Then, during a step of automatic classifying (403) of the images in the image collection comprising "n" images, a fingerprint distance between each image "i" in the image collection and each of the other "n−1" images in the image collection is determined. Based on this determination, each of the "n−1" images are classified in one of the fingerprint distance zones defined in step 402, according to the determined fingerprint distance. Arrow 404 indicates the repetition of the step 403 for all images in the image collection. The method is done in step 405.

Figure 5:
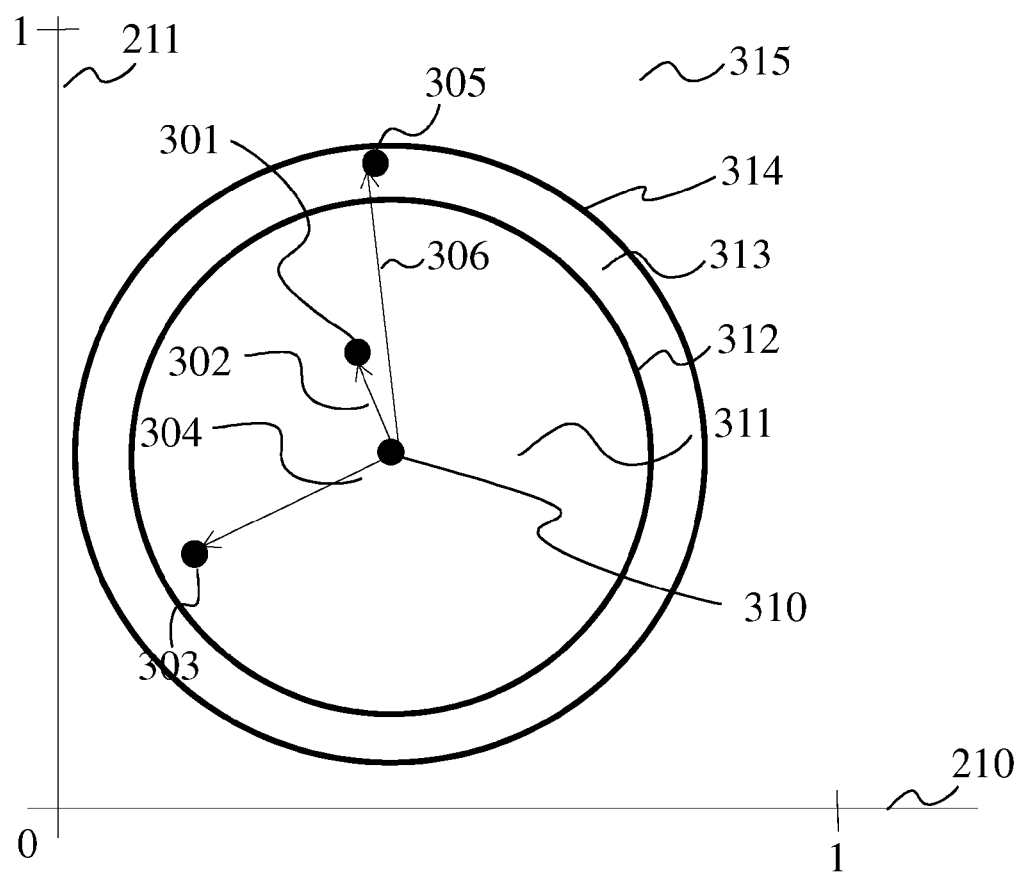
FIGS. 5-7 illustrate two thresholds set at different fingerprint distances according to perception of different users.
Figure 6:
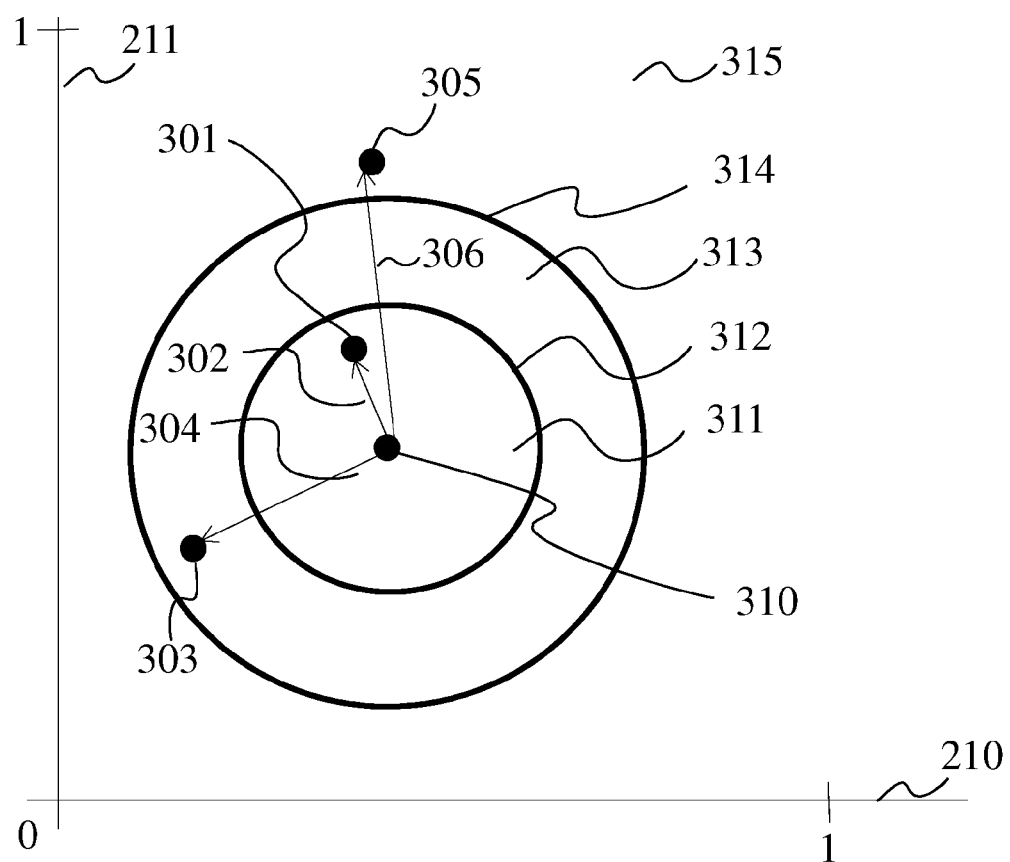
Figure 7:
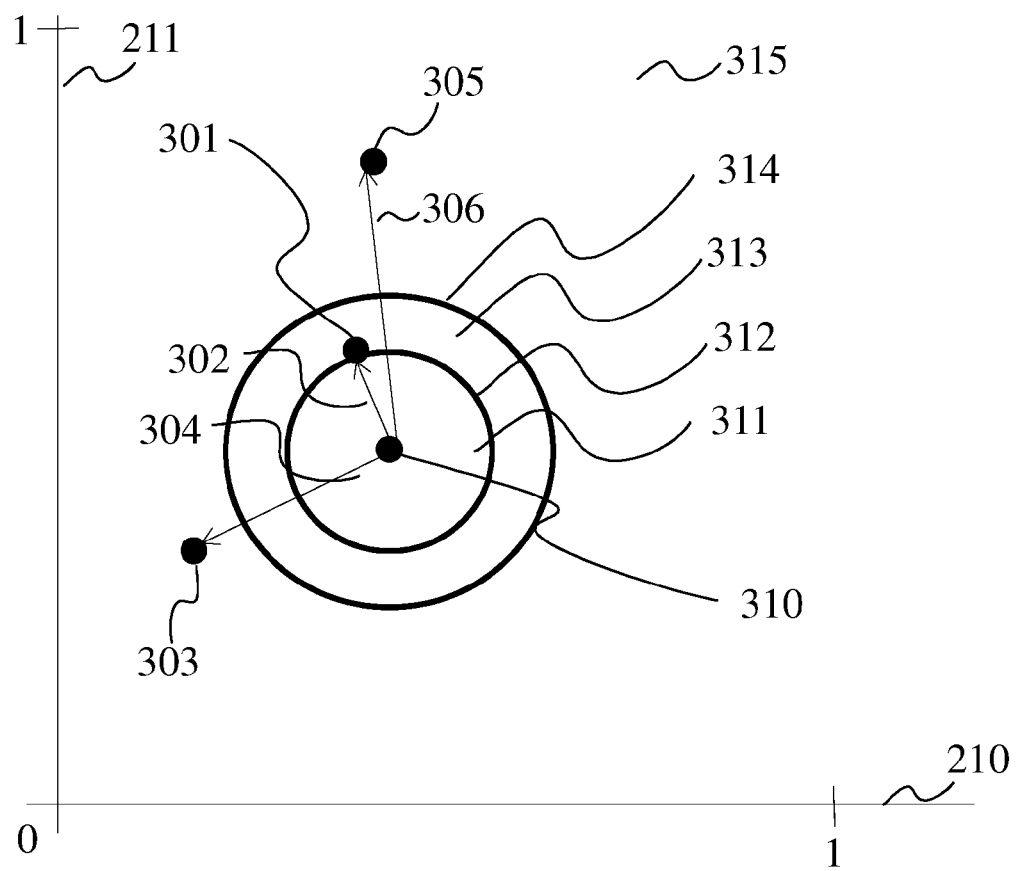

FIGS. 5, 6 and 7 illustrate two thresholds set at different fingerprint distances according to perception of different users, respectively users X, Y and Z. Referring to FIG. 5 and user X, this user perceives images A (301) and B (303) as being in the zone of slightly modified images (311), whereas Image C (305) is in the zone of largely modified images (313). Referring to user Y and FIG. 6, this user perceives image A (301) as being in the zone of slightly modified images (311), image B (303) in the zone of largely modified images (313) and image C (305) in the zone of different images (315). Referring to FIG. 7 and user Z, this user perceives image A (301) in the zone of largely modified images (313) whereas images B (303) and C (305) are being situated in the zone of different images (315).

Now that the first (th1) and second (th2) thresholds are set according to the user perception, it is thus possible to determine according to the user perception if an image is in the set of identical images, in the set of slightly modified images, in the set of largely modified images or in the set of different images, and to associate metadata accordingly as described by EP 11306284.8. Referring again to the previously discussed eight parameter homographic model of spatial distortion, to determine in which of the previously discussed zones an image falls, the parameters $h_{ij}$ are determined for the image (for example the previously mentioned 'b' image) when compared to another image (for example the previously mentioned 'a' image). This determination is done using prior-art methods (distortion estimation). When the $h_{ij}$ parameters are determined, it is determined in which zone the parameters are situated, the zones being delimited by thresholds th1 and th2, each representing different maximum values for the $h_{ij}$ parameters.

Figure 8:
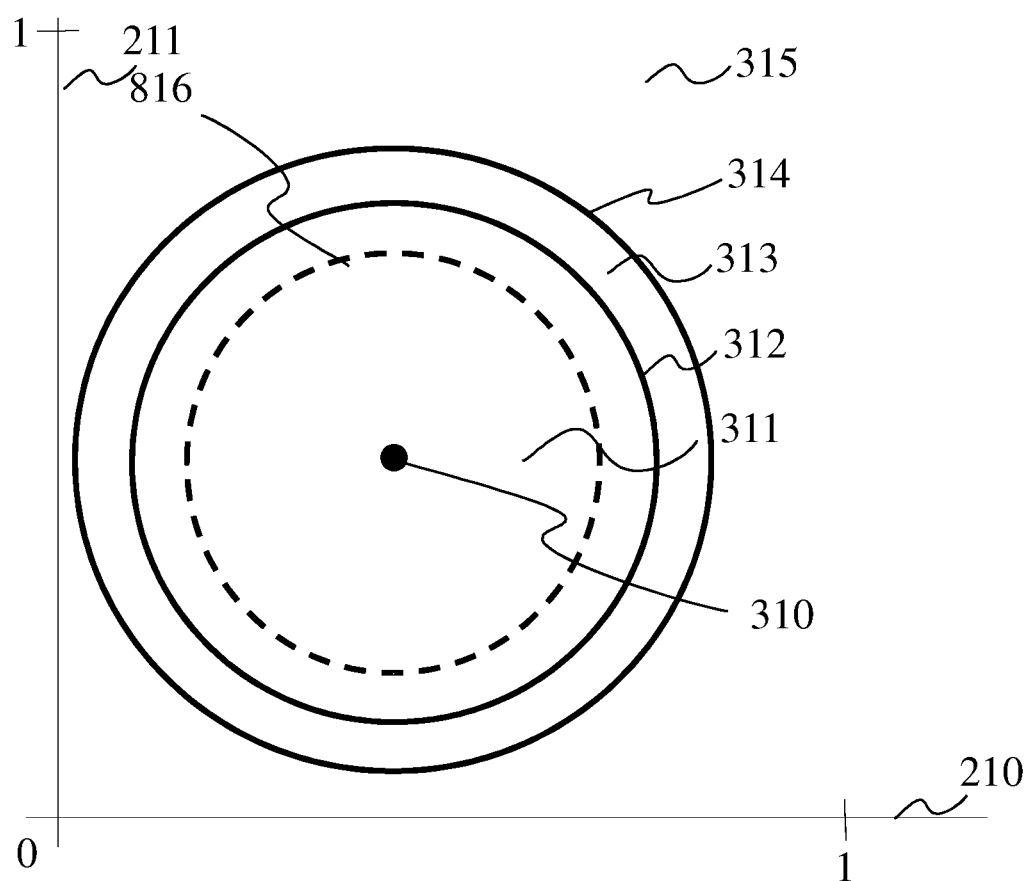
FIGS. 8-10 illustrate the notion of a limit or a third threshold between use of a precise method and the less precise method for determination of fingerprint distance.
Figure 9:
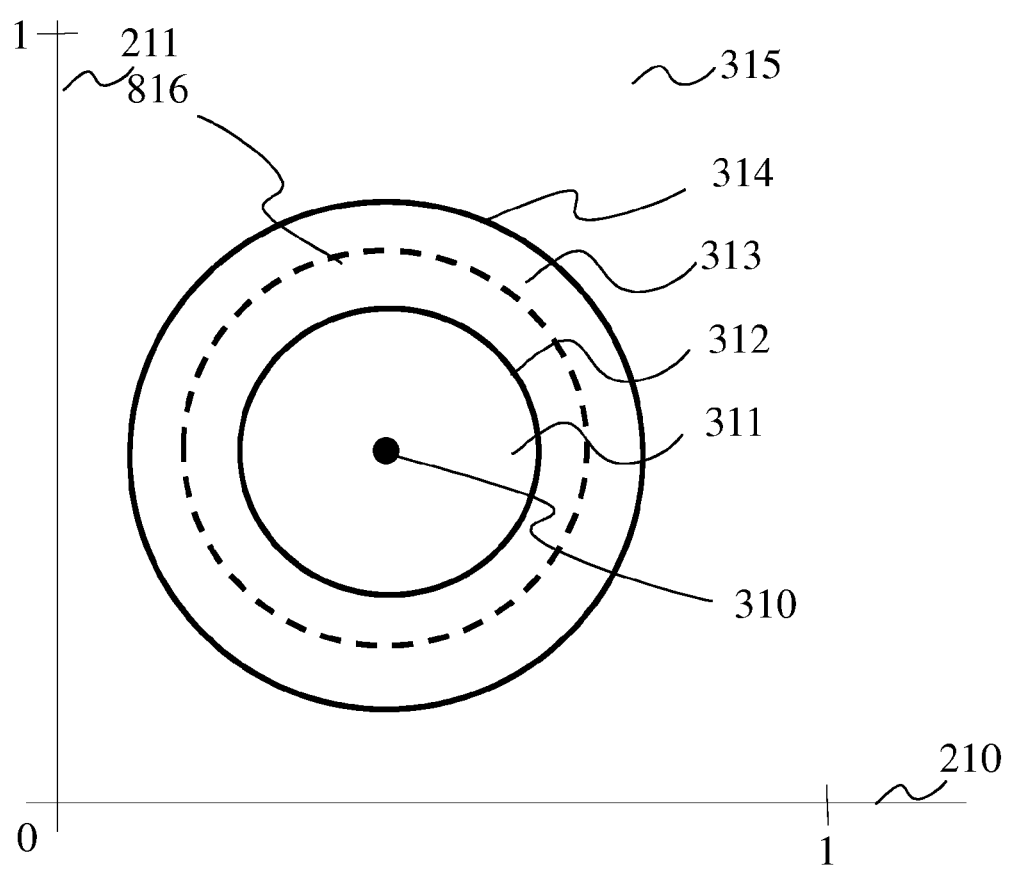
Figure 10:
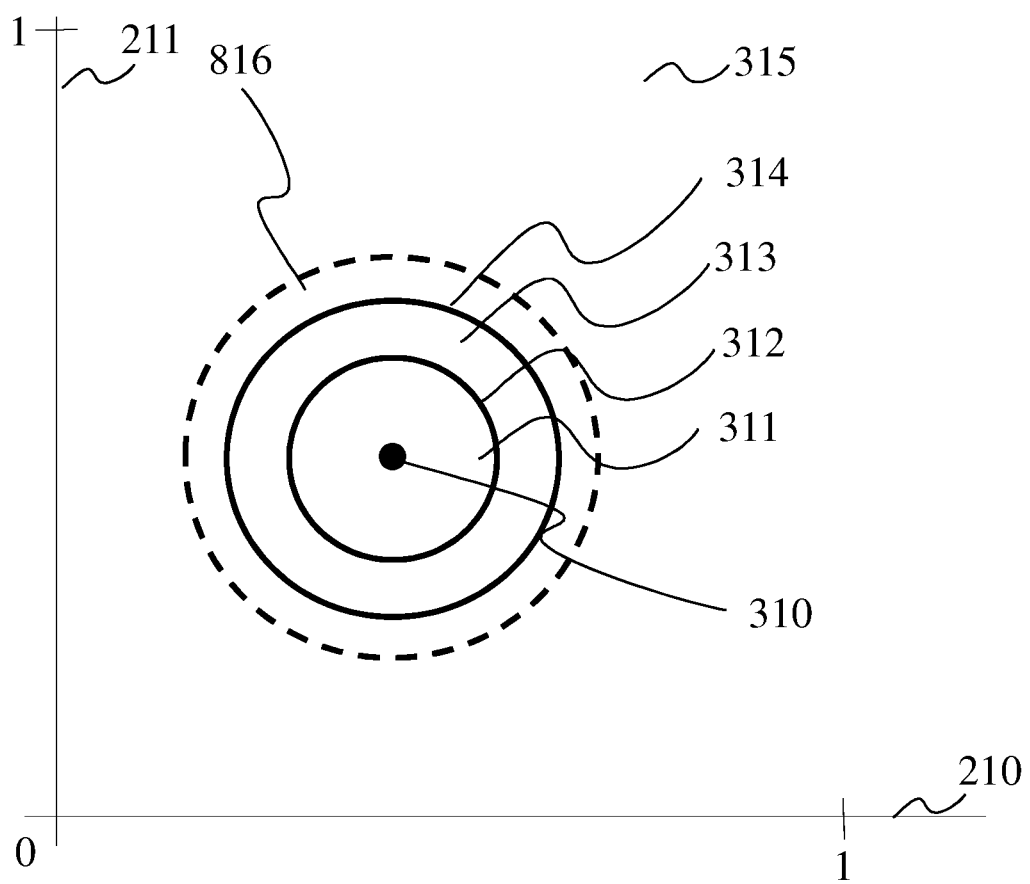

In order to further optimize the method of the invention, it is possible to accelerate the determination of fingerprint distance, by using between several fingerprint determination methods such as a fingerprint determination methods that obtain results with different precision. The choice between either one method is predetermined by a constraint intrinsic to each method, to which we also will refer as a third threshold of fingerprint distance. To determine fingerprint distances that are in a zone that is relatively close to the fingerprint of the reference image, a rather precise method based on the points-of-interest technique (e.g. SIFT (Scale Invariant Feature Transform), SURF (Speeded Up Robust Feature)) is used, and for fingerprint distances that are outside that zone, a less precise method (e.g., the grid-based Libpuzzle) can be used, the differences between images in the first mentioned zone being less important than in the second mentioned zone. Adapting the preciseness of the fingerprint determination method can give an advantage in computing time for the determination of the fingerprint as has been previously mentioned. The position of the intrinsic constraint depends on the chosen methods. FIGS. 8-10 illustrate which of two fingerprint determination methods to use between a precise and a less precise fingerprint determination method, and its dependence of the choice from the previously discussed positioning of the first and second thresholds.

According to FIGS. 8-10, circle 816 defines a limit or a third threshold between use of the precise method and the less precise method.

According to FIG. 8, the third threshold thc (816) is INSIDE the zones defined by the first threshold th1 (312) AND the second threshold th2 (314). Thus, to distinguish in which fingerprint distance zone a new image falls, it is sufficient to use the less precise fingerprint distance determination method.

According to FIG. 9, the third threshold thc (816) is OUTSIDE the zone defined by the first threshold th1 (312) BUT INSIDE the zone defined by the second threshold th2 (314).

To distinguish in which image fingerprint distance zone an image falls, the precise image fingerprint distance determination method is to be used for determination if an image is in the first zone of slightly modified images, but to distinguish if an image is in the zone of largely modified images or in the zone of different images, a less precise image fingerprint distance determination method is sufficient.

According to FIG. 10, the third threshold thc (816) is OUTSIDE the zones defined by the first threshold th1 (312) AND the second threshold th2 (314). The third threshold defining the limit between using the precise or the less precise fingerprint distance determination method (inside: precise: outside: less precise). Thus, to distinguish in which image fingerprint distance zone a new image falls, the precise fingerprint distance determination method is to be used.

Figure 11:
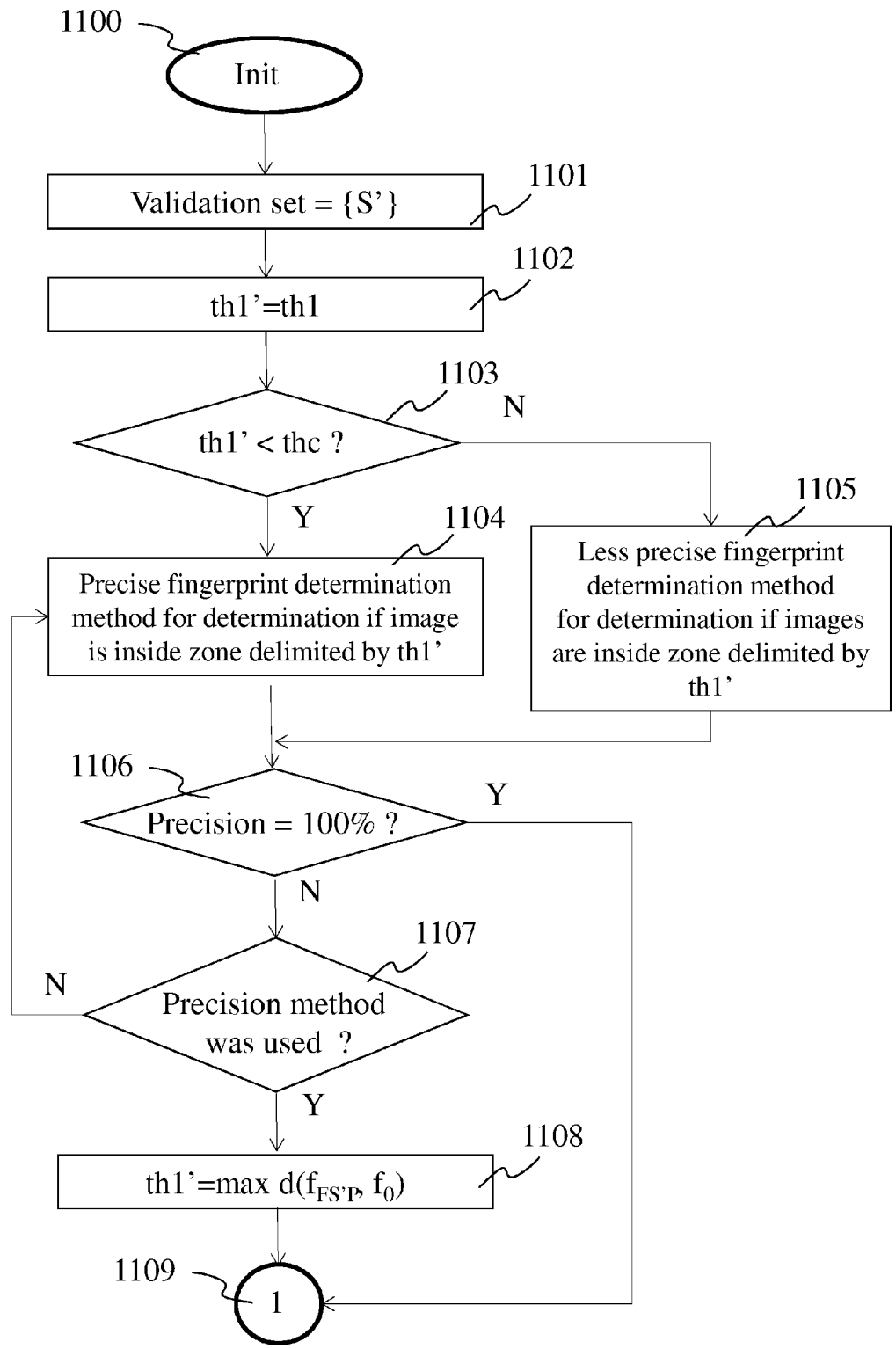
FIGS. 11-13 illustrate a variant embodiment of the invention.
Figure 12:
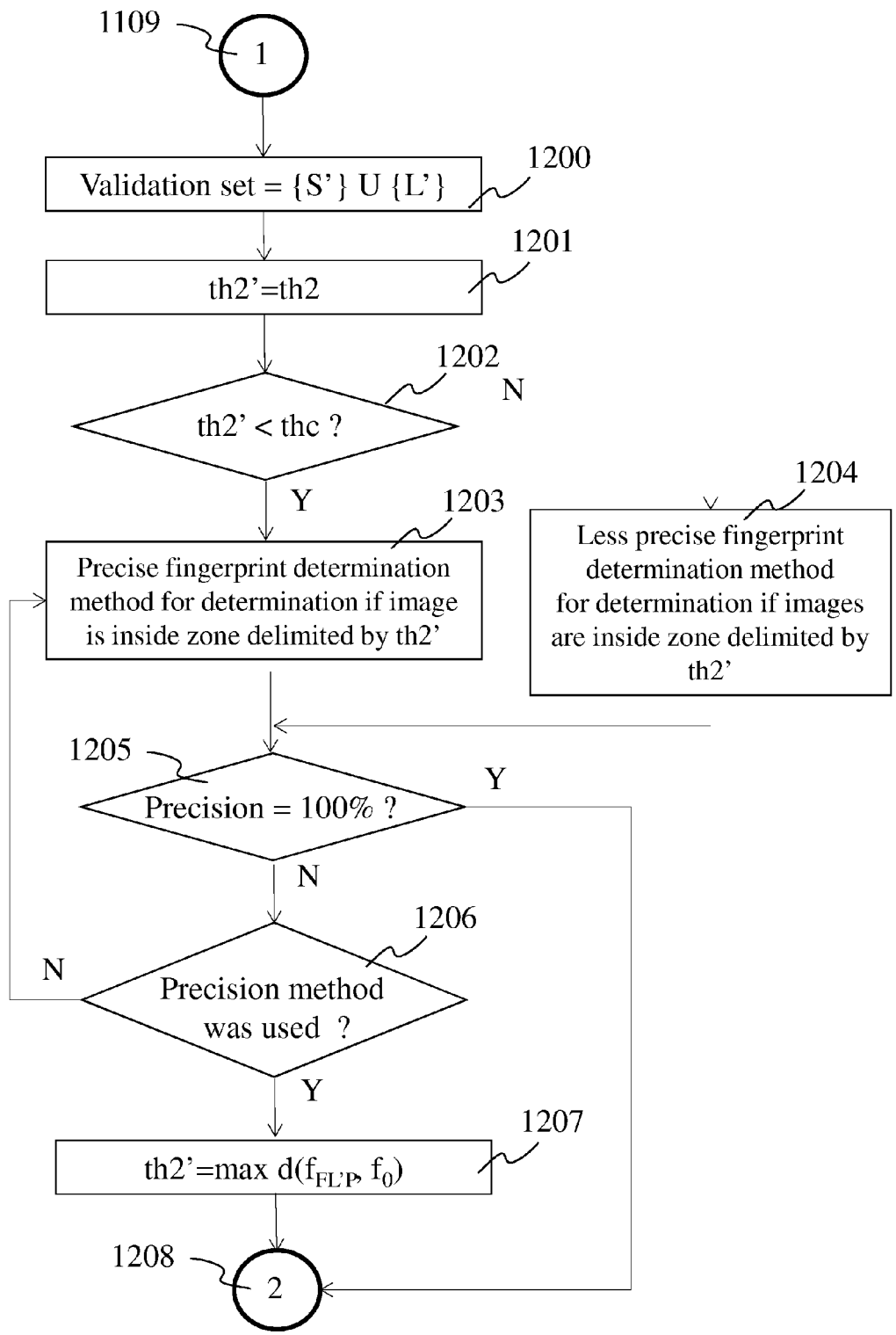
Figure 13:
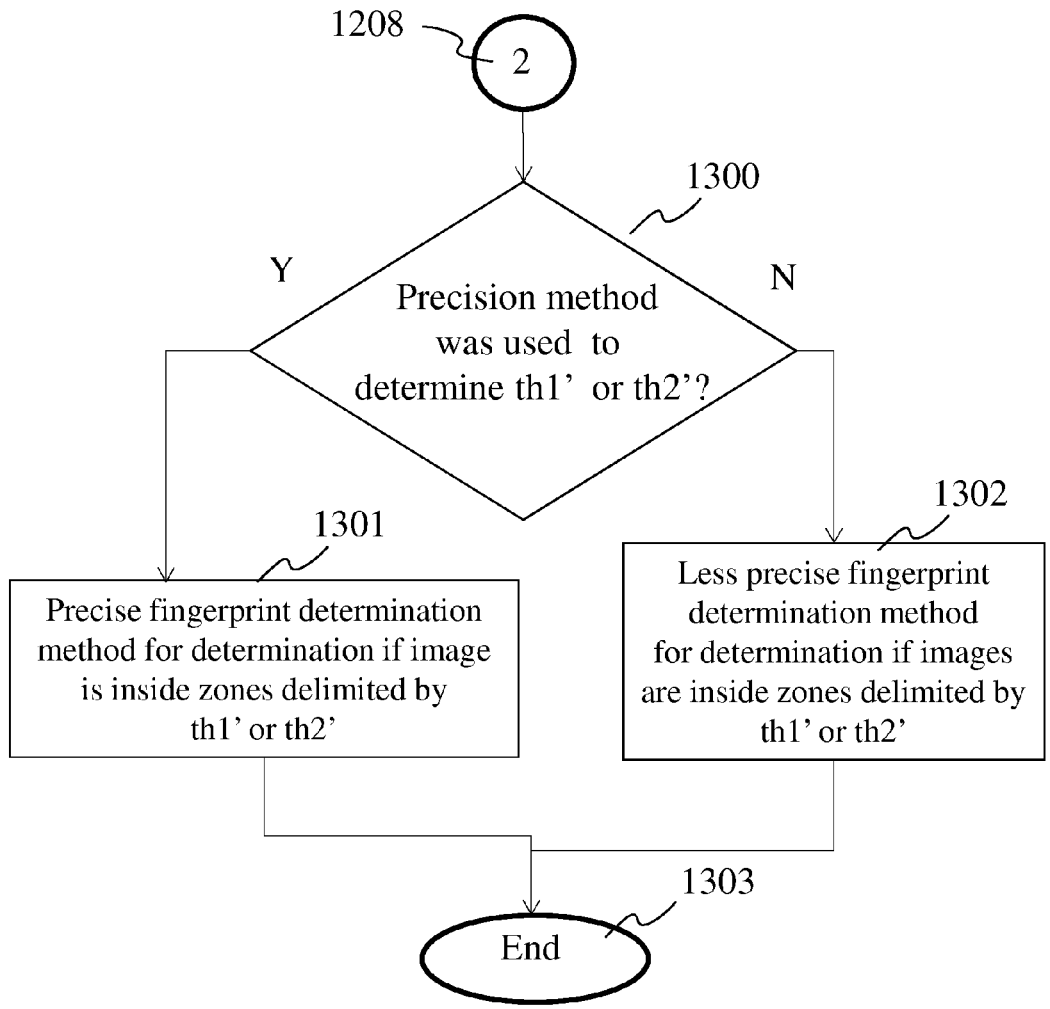

According to an alternative embodiment illustrated with the help of FIGS. 11-13, the method of the invention can be further improved by adding a verification or fine-tuning step. According to this additional step, instead of determining the thresholds th1 and th2 based on the presentation of a set of images to the user, using the method of the invention; the user inputs a set of images, for example from his own collection of images, and the de-duplication system classifies the images within the different zones (identical, slightly modified, largely modified, different) according to the thresholds th1 and th2 that were determined with the method of the invention. In this verification step, the user can contradict the classification made, when he is of the opinion that some images are wrongly classified by the de-duplication system. The thresholds th1 and th2 are thus adjusted with the help of the user, who submits a number of images from his personal collection to the method of the invention: a reference image and transformed images, ranging from slightly modified and largely modified to different images. When the adjustment of the thresholds results in a displacement of one of these or both of these thresholds with regard to the third threshold thc, it may be necessary to use a precise fingerprint determination method where previously the use of a less precise fingerprint method was sufficient. For example, the verification step results in moving of the first threshold from outside the zone delimited by the third threshold (FIG. 8) to inside the zone delimited by the third threshold (FIG. 9). Where according to FIG. 8 the use of less precise fingerprint method was sufficient, it is no longer sufficient when the th1 threshold is moved within the zone delimited by the third threshold according to FIG. 9.

Further referring to FIGS. 11-13,

{S} refers to a set of images presented to the user, during a configuration phase, and classified by the user as Slightly modified images;

{L} refers to a set of images presented to the user, during the configuration phase, and classified by the user as Largely modified images;

{D} refers to a set of images presented to the user, during the configuration phase, and classified by the user as Different images;

{S}, {L} and {D} are used by the method to set the th1 and th2 thresholds:

$$th1 = \max d(f_s, f_0), th2 = \max d(f_L, i_0).$$

Where f stands for fingerprint.
d stands for fingerprint distance.
$f_0$ stands for a fingerprint of a reference image.
thc is the third threshold of fingerprint distance.
max $d(fs, f_0)$ is the maximum fingerprint distance measured from the reference image $f_0$ to images in the set {S}.
and max $d(f_L, f_0)$ is the maximum fingerprint distance measured from the reference image $f_0$ to images in the set {L}.

{S'}, {L'} and {D'} are the sets of images classified by the de-duplication system, using the thresholds th1 and th2, from a set of images presented by the user from his own collection to the de-duplication system.

$f_s'$ stands for a fingerprint of an image from set {S'}

$f_{FS'P}$ stands for a fingerprint of an image that was wrongly classified (according to the initial settings of thresholds th1 and th2) into the set {S'} but that according to the user, based on his own image set provided, rather must be in a set {L'} or even {D'}.

$f_{FL'P}$ stands for a fingerprint of an image that was wrongly classified (according to the initial setting of thresholds th1 and th2) into the set {L'} but that according to the user, based on his own image set provided, rather must be in a set {S'} or even {D'}.

$f_{FS'P}$, $f_{FL'P}$ are used by the de-duplication system to eventually adjust th1 and th2 into th1' and th2'.

max $d(f_{FS'P}, f_0)$ is the maximum fingerprint distance measured from the reference image $f_0$ to an image that was wrongly classified into the set {S'}.

max $d(f_{FL'P}, f_0)$ is the maximum fingerprint distance measured from the reference image $f_0$ to an image that was wrongly classified into the set {L'}.

In FIG. 11, it is determined if threshold th1 must be adjusted to th1' and where it is determined which fingerprint determination is best suited to determine if images are under threshold th1'.

In FIG. 12, it is determined if the threshold th2 must be adjusted to th2' and where it is determined which fingerprint determination is best suited to determine if images are under threshold th2'.

In FIG. 13, it is determined what is the fingerprint method to be used to determine if images are inside the zones delimited by th1' or th2'.

Referring to FIG. 11, in a first step 1100, variables needed for the execution of the algorithm are initialized. In a step 1101, the set of images on which FIG. 11 operates is set to {S'}. Then, in a step 1102, the first threshold th1' is set to th1 (max $d(f_s, f_0)$). In a decisional step 1103, it is verified if th1' is inferior to the third threshold thc. If so, the precise fingerprint determination method is to be used for determination if images are inside the zone delimited by the first threshold th1' (1104). If not so, the less precise fingerprint determination is sufficient to do the same (1105). In a decisional step 1106, it is determined if, using the chosen method, (precise or less precise) the image falls indeed in the zone of slightly modified images. If this is the case, the applied method for fingerprint determination is sufficient and th1' is set correctly and does not need to be adjusted and the algorithm is continued with step 1200 of FIG. 12 where the positioning of th2' is verified based on the user presented images and where it is verified if the chosen fingerprint determination method is the right one to be able to discriminate between largely modified images and different images. If however the image does not fall into the zone of slightly modified images, it is determined in a step 1107 which method was used to determine in which zone the image falls. If the precise method was not used, the algorithm returns to step 1104 and uses the precise method to see if this gives a better result. If the precise method was already used, this means that th1' is not set correctly and must be adjusted to a new value that is equal to max $d(f_{FS'P}, f_0)$. Then the algorithm continues with step 1200 of FIG. 12.

Referring to FIG. 12, this figure is nearly the same as FIG. 11. In a first step 1200, the set of images on which FIG. 11 operates is set to whole of {S'} and {L'}. Then, in a step 1201, the second threshold th2' is set to th2 (max d($f_L$,$f_0$)). In a decisional step 1202, it is verified if th2' is inferior to the third threshold thc. If so, the precise fingerprint determination method is to be used for determination if images are inside the zone delimited by the second threshold th2' (1203). If not so, the less precise fingerprint determination is sufficient to do the same (1204). In a decisional step 1205, it is determined if, using the chosen method, (precise or less precise) the image falls indeed in the zone of largely modified images. If this is the case, the applied method for fingerprint determination is sufficient and th2' is set correctly and does not need to be adjusted and the algorithm is continued with step 1300 of FIG. 13. If however the image does not fall into the zone of largely modified images, it is determined in a step 1206 which method was used to determine in which zone the image falls. If the precise method was not used, the algorithm returns to step 1203 and uses the precise method to see if this gives a better result. If the precise method was already used, this means that th2' is not set correctly and must be adjusted to a new value that is equal to max d($f_{FL'P}$, $f_0$). Then the algorithm continues with step 1300 of FIG. 12.

Referring to FIG. 13, the final selection of the fingerprint method (precise or less precise) is decided according to the adjusted thresholds.

Figure 14:
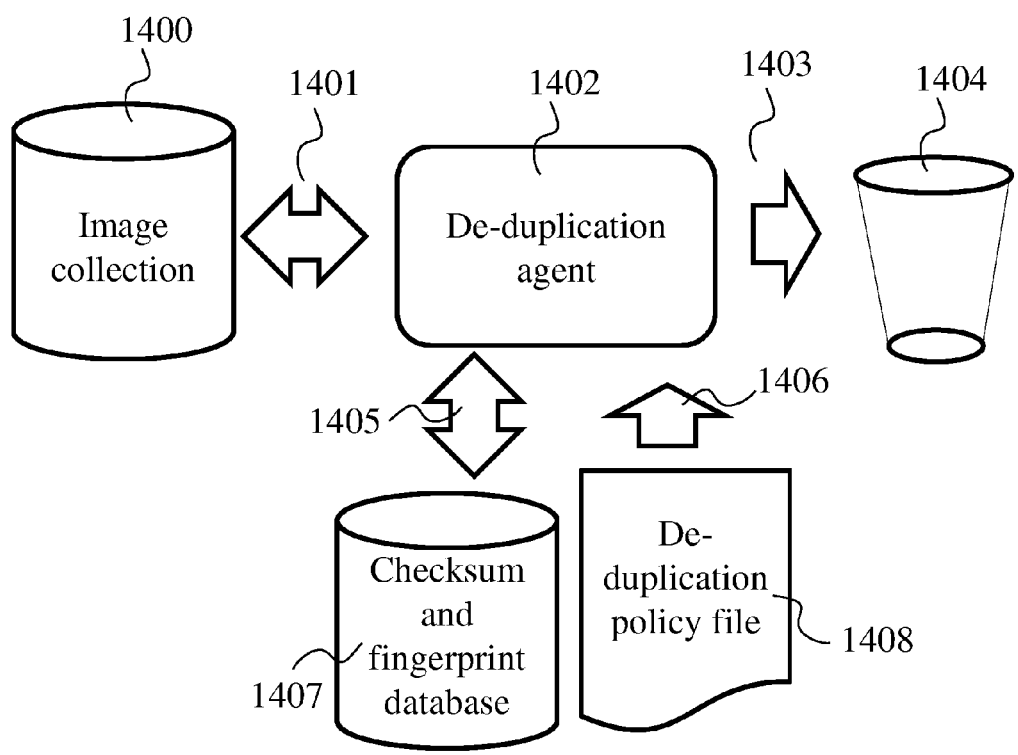
FIG. 14 illustrates a clean-up mode of an automatic de-duplication agent implementing the invention.

The method of the invention can be implemented as part of an automatic de-duplication agent. The de-duplication agent can then be used as a stand-alone tool to clean up a user's photo album for example. This is illustrated in FIG. 14, the checksums and/or fingerprints of all the images in the photo database are computed and stored in a checksum/fingerprint database 1407, then the de-duplication agent 1402 identifies the duplicate images and the unique images in the image collection 1400 (connected to de-duplication agent 1402 via connection 1401) using the information contained in the de-duplication policy file 1408 and the checksum/fingerprint database 1407 and using the tagging algorithm described by EP 11306284.8. Finally, the duplicate images are removed from the image collection 1400 (illustrated by connection 1403 to wastebasket 1404) while the unique images are kept, and the checksum/fingerprint database 1407 is updated by means of a connection 1405.

FIG. 15 illustrates an autonomous mode of a de-duplication agent 1402 implementing the invention, where the image collection 1400 is managed so that the image collection 1400 never has duplicates (according to the user perception). When a user submits a candidate image 1402 to the de-duplication agent 1402 implementing the invention, the fingerprint and/or checksum of the candidate image is calculated, with this information and the information stored in the de-duplication policy file 1406 and the checksum and fingerprint database 1407, the de-duplication agent 1402 decides whether the candidate image is added to the image collection 1400 or if it is discarded (wastebasket 1404). The checksum/fingerprint database 1407 is updated accordingly.

Alternatively, the method of the invention is part of a de-duplication agent implemented in a Digital Assets Management (DAM) framework, where the de-duplication agent implementing the invention is used to keep the image collection in the DAM framework free of duplicate images by applying the policy and user perception as defined by the user.

Figure 16:
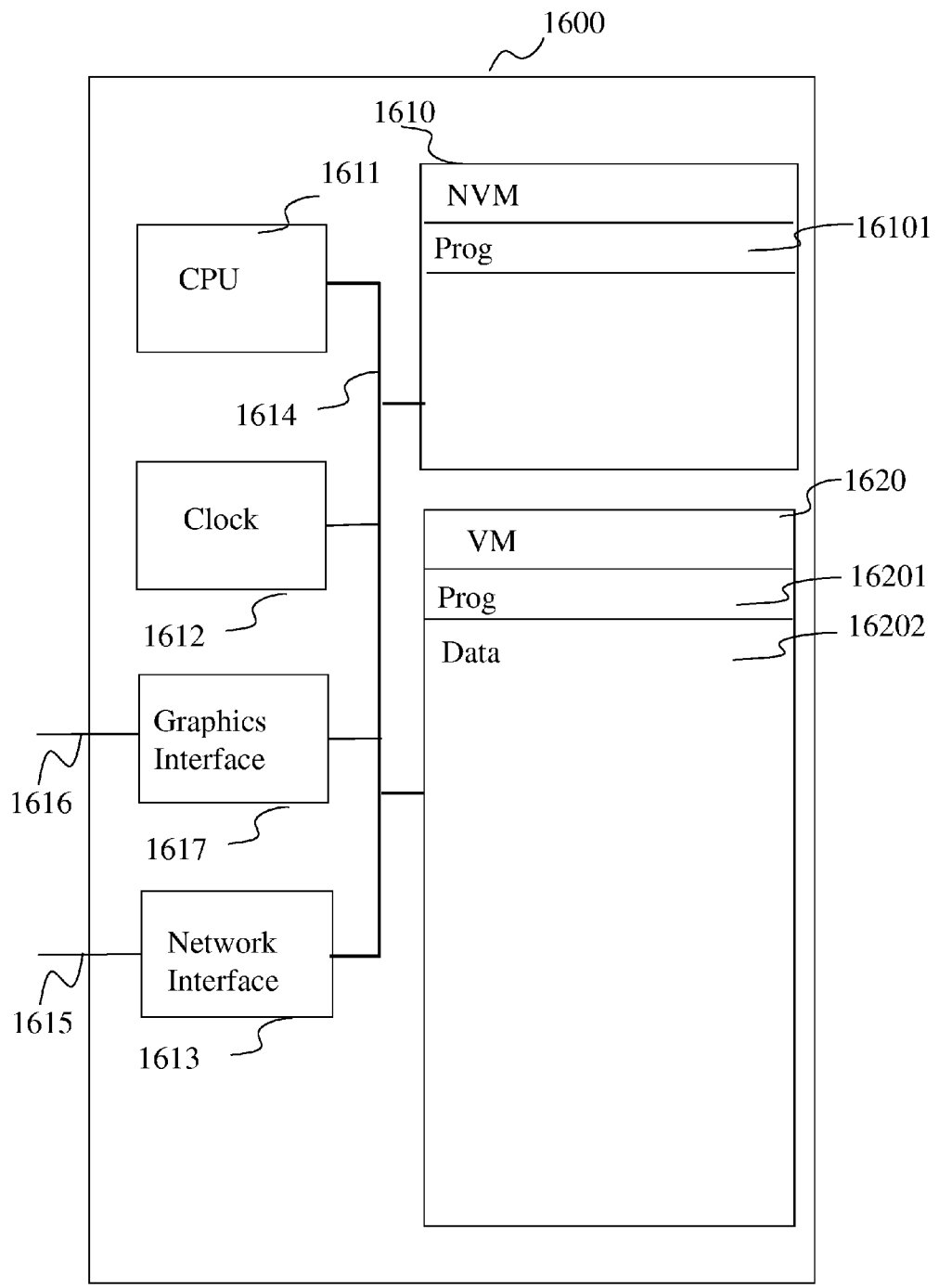
FIG. 16 shows an example of a device implementing the invention.

FIG. 16 shows an example of a device implementing the invention. The device 1600 comprises the following components, interconnected by a digital data- and address bus 1614:

- a processing unit 1611 (or CPU for Central Processing Unit);
- a non-volatile memory NVM 1610;
- a volatile memory VM 1620;
- a clock unit 1612, providing a reference clock signal for synchronization of operations between the components of the device 1600 and for other timing purposes;
- a network interface 1613, for interconnection of device 1600 to other devices connected in a network via connection 1615;
- a graphics interface 1617, for presenting of images to a user via a rendering device connected to connection 1616, for example for presenting images during a step of classifying transformed images according to user perception.

It is noted that the word "register" used in the description of memories 1610 and 1620 designates in each of the mentioned memories, a low-capacity memory zone capable of storing some binary data, as well as a high-capacity memory zone, capable of storing an executable program, or a whole data set.

Processing unit 1611 can be implemented as a microprocessor, a custom chip, a dedicated (micro-) controller, and so on. Non-volatile memory NVM 1610 can be implemented in any form of non-volatile memory, such as a hard disk, non-volatile random-access memory, EPROM (Erasable Programmable ROM), and so on. The Non-volatile memory NVM 1610 comprises notably a register 16101 that holds a program representing an executable program comprising the method according to the invention. When powered up, the processing unit 1611 loads the instructions comprised in NVM register 16101, copies them to VM register 16201, and executes them.

The VM memory 1620 comprises notably:
- a register 16201 comprising a copy of the program 'prog' of NVM register 16101;
- a register 16202 comprising read/write data that is used during the execution of the method of the invention.

A device such as device 1600 is an example of a device that is suited for implementing the method of the invention.

The device 1600 comprises means for providing a set of transformed images to a user (for example: graphics interface 1617, and/or an image database providing a precalculated set of transformed images and/or a calculation means such as CPU 1611 calculating transformed images), the transformed images being based on a same reference image, means for classification (e.g. CPU 1611, memory 1620) of the transformed images into different image sets according to user perception of resemblance of the transformed images to the reference image, each of the transformed images having a different associated fingerprint distance related to the reference image, means for determination (for example CPU 1611), from the classification by the user, of at least one fingerprint distance that delimits the determined image sets within fingerprint distance zones; means (1611) for determining of a fingerprint distance between an image i and each of other n−1 images in the image collection, and means (1611, 1620) for classifying each of other n−1 images in one of said fingerprint distance zones according to the determined fingerprint distance.

According to a variant embodiment of the device 1600, the device further comprises means (1611, 1620) for associating an action to each of the determined fingerprint distance zones, and means (1611, 1620) for executing of an action associated to fingerprint distance zone for each image that is classified in one of the fingerprint distance zones.

The different variant embodiments can be combined to form a particular advantageous variant embodiment.

Other device architectures than illustrated by FIG. 16 are possible and compatible with the method of the invention. Notably, according to variant embodiments, the invention is implemented as a pure hardware implementation, for example in the form of a dedicated component (for example in an ASIC, FPGA or VLSI, respectively meaning Application Specific Integrated Circuit, Field-Programmable Gate Array and Very Large Scale Integration), or in the form of multiple electronic components integrated in a device or in the form of a mix of hardware and software components, for example as a dedicated electronic card in a computer.

Figure 17:
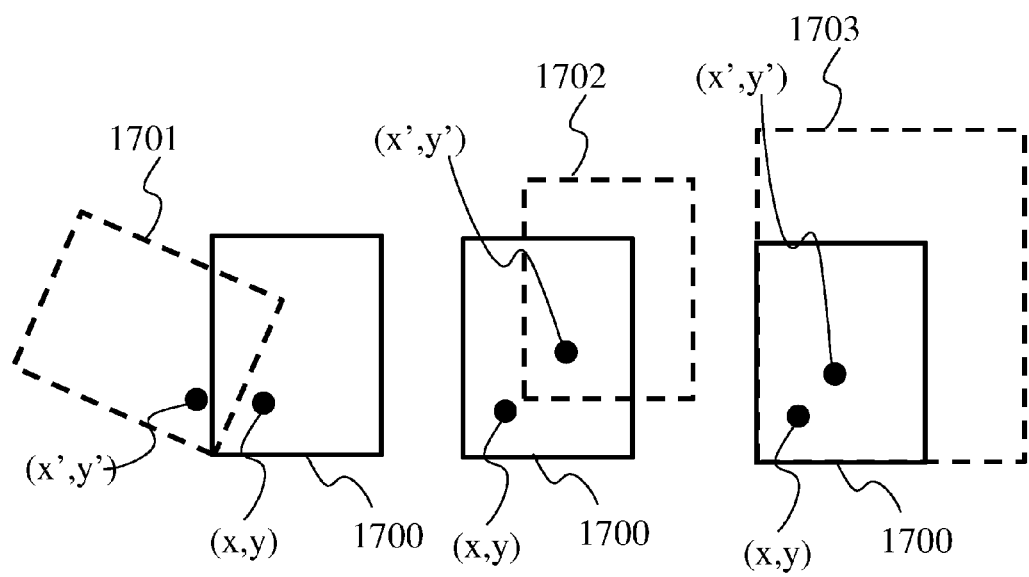
FIG. 17 illustrates some different geometrical distortions of an image.

FIG. 17 illustrates some different geometrical distortions of an image. FIG. 17a represents an image rotation: image 1700 is rotated to form transformed image 1701. FIG. 17b represents a shift distortion: image 1700 is shifted to form a transformed image 1702. FIG. 17c represents a scale distortion: image 1703 is scaled to form a transformed image 1703. Referring to the previously discussed geographic distortion model, a point (x,y) in the original image has coordinates (x',y'), after transformation. For each of the transformed images, the repositioning of the (x,y) coordinates of a point of the image can thus be characterized by specific values for corresponding $h_{ij}$ parameters (for example specific values for h10, h10, h20 and h21) for the rotated image. Of course, multiple types of image distortions can be combined in a transformed image (for example, scaling AND rotation).

Figure 18:
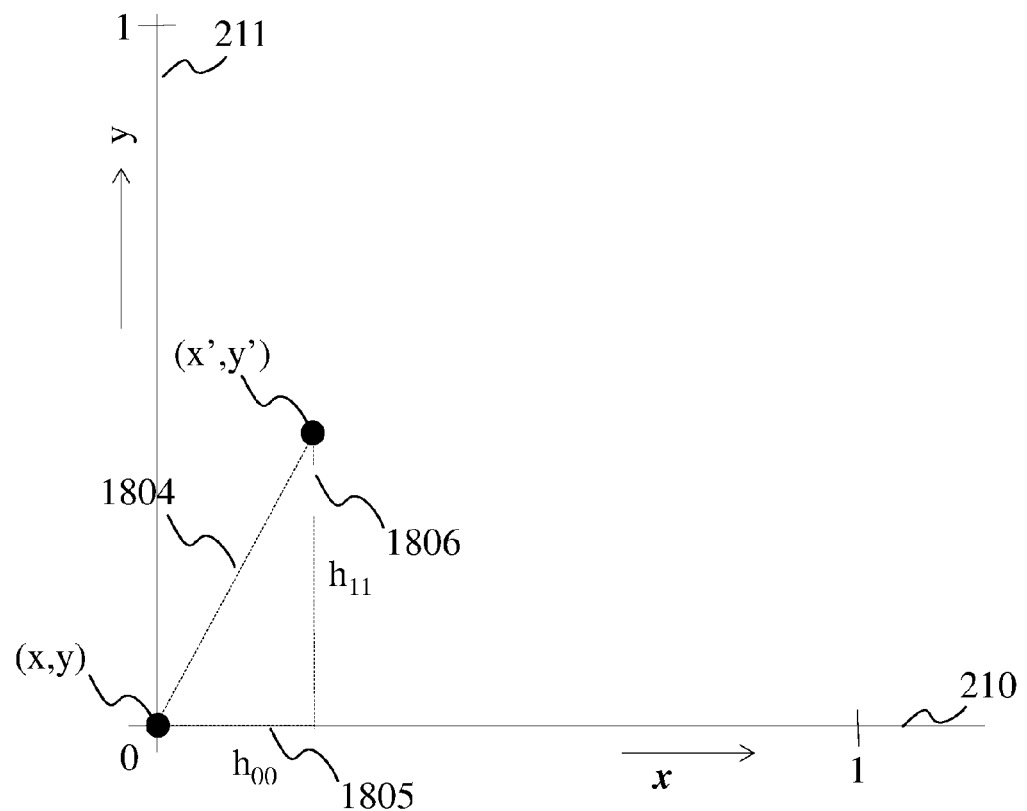
FIG. 18 illustrates some of the usual norms of a vector $R^n$ (fingerprint) that can be used to determine a fingerprint distance.

FIG. 18 illustrates some of the usual norms of a vector R" (fingerprint) that can be used to determine a fingerprint distance. For the sake of clarity, n=2 here.

A useful class of vector norms is the p-norm defined by: $\|x\|_p = (|x_1|^p + \ldots + |x_n|^p)^{1/p}$, where $p \geq 1$ and $X \square R^n$.

If p=1, the norm is known as the Hamilton distance. This distance is computed as $\|x\|_1 = h00$ (1805)+h11 (1806) in FIG. 18.

If p=2, the norm is known as the Euclidean distance. This distance is computed as $\|x\|_2 = (|h00|^2 + |h11|^2)^{1/2}$ in FIG. 18 and is represented by the line 1804.

Finally, if p=∞, the distance is computed as $\|x\|_\infty = \max(|h00|, |h11|)$ in FIG. 18.

The method of the invention can advantageously be used in the method of automatic management of a collection of images through association of metadata tags as described by EP 11306284.8, the method of the invention allowing to set the thresholds that can be subsequently exploited by EP 11306284.8 to determine which metadata tags to associate to which image of the image collection and associating actions as a function of a type of metadata tag, as described previously with reference to FIG. 1.

The invention claimed is:

1. A method of classifying images in an image collection comprising n images, the method comprising:
   classifying transformed images in image sets according to perceived resemblance, wherein the transformed images are based on a same reference image, and wherein each of the transformed images has a distinct fingerprint distance with regard to the reference image;
   determining at least one fingerprint distance threshold that delimits the determined image sets within fingerprint distance zones;
   classifying the images in the image collection, comprising, for each image i in the image collection;
   determining of a fingerprint distance between said image i and each of other n−1 images in the image collection; and
   classifying said each of other n−1 images in one of said fingerprint distance zones according to the determined fingerprint distance.

2. The method according to claim 1, further comprising:
   associating an action with each of the fingerprint distance zones; and
   for each image classified in one of said fingerprint distance zones, executing an action associated with said fingerprint distance zone.

3. The method according to claim 1, wherein:
   said at least one fingerprint distance threshold comprises at least a first and at least a second fingerprint distance threshold, said first fingerprint distance threshold limiting a first fingerprint distance zone inside which is a set of transformed images classified in an identical and slightly modified image set; and
   said second fingerprint distance threshold delimits a second zone outside said first zone and inside of which are transformed images classified in a largely modified image set and outside of which are transformed images classified in an image set of different images.

4. The method according to claim 3, further comprising:
   choosing a fingerprint distance determination method for determining in which of said fingerprint distance zones an image falls, as a function of a position of said first and second thresholds relative to a position of a third threshold of fingerprint distance that determines a fingerprint distance zone inside which a first fingerprint determination method is used, and outside of which a second fingerprint determination method is used.

5. The method according to claim 4, wherein said first fingerprint determination method is according to a local description approach, and said second fingerprint method is according to a global description approach.

6. The method according to claim 1, wherein said fingerprint distance is determined according to Euclidian-based distances.

7. An image management device for classifying images in an image collection comprising n images, the device comprising:
   at least one processor; and
   a memory coupled to the at least one processor,
   the at least one processor configured to:
   classify transformed images in image sets according to perceived resemblance, wherein the transformed images are based on a same reference image, and wherein each of the transformed images has a distinct fingerprint distance with regard to the reference image;
   determine at least one fingerprint distance threshold that delimits the determined image sets within fingerprint distance zones;
   classify the images in the image collection, and for each image i in the image collection;
   determine a fingerprint distance between said image i and each of other n−1 images in the image collection; and
   classify each of other n−1 images in one of said fingerprint distance zones according to the determined fingerprint distance.

8. The device according to claim 7, wherein the at least one processor is further configured to:
   associate an action with each of the fingerprint distance zones; and
   execute, for each image classified in one of said fingerprint distance zones, an action associated with said fingerprint distance zone.

9. The device according to claim 7, wherein:
   said at least one fingerprint distance threshold comprises at least a first and at least a second fingerprint distance threshold, said first fingerprint distance threshold limiting a first fingerprint distance zone inside which is a set of transformed images classified in an identical and slightly modified image set; and said second fingerprint distance threshold delimits a second zone outside said first zone and inside of which are transformed images classified in a largely modified image set and outside of which are transformed images classified in an image set of different images.

10. The device according to claim 9, wherein the at least one processor is further configured to:
choose a fingerprint distance determination method for determining in which of said fingerprint distance zones an image falls, as a function of a position of said first and second thresholds relative to a position of a third threshold of fingerprint distance that determines a fingerprint distance zone inside which a first fingerprint determination method is used, and outside of which a second fingerprint determination method is used.

* * * * *